US012594152B2

(12) United States Patent
Edwards

(10) Patent No.: US 12,594,152 B2
(45) Date of Patent: Apr. 7, 2026

(54) DENTAL FLOSSING DEVICE

(71) Applicant: REUSEUS LIMITED, Gloucestershire (GB)

(72) Inventor: Giles William Onley Edwards, Gloucestershire (GB)

( * ) Notice: Subject to any disclaimer, the term of this patent is extended or adjusted under 35 U.S.C. 154(b) by 220 days.

(21) Appl. No.: 18/377,387

(22) Filed: Oct. 6, 2023

(65) Prior Publication Data

US 2024/0115365 A1     Apr. 11, 2024

(30) Foreign Application Priority Data

Oct. 7, 2022    (GB) ..................................... 2214773

(51) Int. Cl.
*A61C 15/04*          (2006.01)

(52) U.S. Cl.
CPC .................................. *A61C 15/046* (2013.01)

(58) Field of Classification Search
CPC .................................................... A61C 15/046
See application file for complete search history.

(56) References Cited

U.S. PATENT DOCUMENTS

| | | | | |
|---|---|---|---|---|
| 1,152,825 | A | * | 9/1915 | Litchfield ............ A61C 15/046 |
| | | | | 132/325 |
| 2,354,454 | A | * | 7/1944 | Geffner ................ A61C 15/046 |
| | | | | D28/68 |
| 2,376,750 | A | * | 5/1945 | Bell ..................... A61C 15/046 |
| | | | | 132/324 |

| | | | | |
|---|---|---|---|---|
| 2,492,291 | A | * | 12/1949 | Johnson ............... A61C 15/046 |
| | | | | 132/324 |
| 3,747,612 | A | * | 7/1973 | Davis ................... A61C 15/046 |
| | | | | 132/324 |
| 3,871,392 | A | * | 3/1975 | Thomas ............... A61C 15/046 |
| | | | | D28/68 |
| 3,939,853 | A | | 2/1976 | Spanondis |
| 4,041,962 | A | * | 8/1977 | Johansson .............. A61C 15/02 |
| | | | | 132/323 |
| 4,338,957 | A | | 7/1982 | Meibauer |
| 4,427,018 | A | * | 1/1984 | Lagace ................ A61C 15/046 |
| | | | | 433/141 |
| 4,440,184 | A | * | 4/1984 | Smith .................. A61C 15/046 |
| | | | | 132/323 |
| 4,729,392 | A | * | 3/1988 | Tenny .................. A61C 15/046 |
| | | | | 132/323 |

(Continued)

FOREIGN PATENT DOCUMENTS

| | | | |
|---|---|---|---|
| EP | 2145559 | A1 | 1/2010 |
| ES | 2275429 | A1 | 6/2007 |
| WO | 03047495 | A1 | 6/2003 |

*Primary Examiner* — Nicholas D Lucchesi
(74) *Attorney, Agent, or Firm* — William H. Bollman

(57)          ABSTRACT

The present invention relates to a dental flossing device comprising: a handle extending in a longitudinal axis and a head that deviates from the longitudinal axis of the handle. The head has two arms extending from the handle to define an intermediate space between the arms and a substantially central horn for guiding floss that is arranged on an upper face of the dental flossing device between the two arms and projects into the intermediate space. Each arm has an attachment portion provided at a distal end that is adapted to receive and hold floss stretched across the intermediate space and the handle has one or more grooves on a lower face of the handle for receipt of a loop of floss.

4 Claims, 7 Drawing Sheets

(56) References Cited

U.S. PATENT DOCUMENTS

| | | | | |
|---|---|---|---|---|
| 4,830,032 | A | 5/1989 | Jousson | |
| 4,966,176 | A * | 10/1990 | Lachenberg | A61C 15/046 132/325 |
| 5,375,614 | A * | 12/1994 | Navratil | A61C 15/046 132/325 |
| 5,406,965 | A * | 4/1995 | Levine | A61C 15/046 132/323 |
| 5,782,250 | A * | 7/1998 | Harrah, Jr. | A61C 15/046 132/327 |
| 5,829,458 | A * | 11/1998 | Chodorow | A61C 15/02 132/328 |
| 6,155,274 | A * | 12/2000 | Stein | A61C 15/046 132/327 |
| 6,257,252 | B1 * | 7/2001 | Hall | A61C 15/046 132/323 |
| 6,382,219 | B1 * | 5/2002 | Jelten | A61C 15/046 132/324 |
| 6,440,149 | B1 * | 8/2002 | Potti | A61B 17/244 606/161 |
| 9,844,431 | B2 * | 12/2017 | Lam | A61C 15/046 |
| 2001/0039955 | A1 * | 11/2001 | Winters | A61C 15/046 132/309 |
| 2002/0170570 | A1 * | 11/2002 | Bergman | A61C 15/048 132/322 |
| 2003/0150474 | A1 * | 8/2003 | Doyscher | A61C 15/046 132/325 |
| 2005/0241665 | A1 * | 11/2005 | Hill | A61C 15/046 132/323 |
| 2014/0182618 | A1 | 7/2014 | Dehnavi | |
| 2015/0059791 | A1 * | 3/2015 | Sheppel | A61C 15/046 132/200 |
| 2016/0008114 | A1 * | 1/2016 | Stofko | A61C 15/046 132/323 |
| 2017/0348079 | A1 | 12/2017 | Battaglia | |
| 2022/0125563 | A1 * | 4/2022 | Snyder | A46B 7/042 |

* cited by examiner

DENTAL FLOSSING DEVICE

This application claims priority from GB2214773.0, filed on Oct. 7, 2022, the entirety of which is expressly incorporated herein by reference.

FIELD OF THE INVENTION

The present invention relates to a dental flossing device, in particular a device for holding dental floss; more particularly but not exclusively a reusable device.

BACKGROUND

Many people in many societies are concerned about the environment, sustainability, and reusability issues, for example in relation to single-use plastics. At the same time many such people are users of dental floss. The present invention relates to dental flossing, and an eco-friendly solution to flossing.

Flossing daily removes hidden pieces of food and helps to rid a user's mouth of bacteria that can turn into plaque, which causes cavities and gum disease. If the user does not remove plaque by brushing and flossing, it hardens into calculus, or tartar. The calculus can build up under gums and increase risk of gum disease.

However dental floss is often not biodegradable, and devices used for holding the floss are typically formed in synthetic plastics that are single use.

The present invention provides a reusable device for holding any type of dental floss.

Prior Art

US20170348079 (BATTAGLIA) discloses an oral care device that both simultaneously flosses between teeth and scrapes a tooth surface.

US20140182618 (JAFARI) discloses a dental floss holder for holding dental floss filament.

WO200347495 (KAWASE) discloses an interdental cleaner.

U.S. Pat. No. 4,338,957 (MEIBAUER) discloses a dental prophylaxis device.

ES2275429 (JIMENEZ RUIZ MIGUEL JAVIER) discloses an applicator for dental floss.

EP2145559 (IGNACCHITI GIOVANNI) discloses a tooth brush with an integrated dental floss.

U.S. Pat. No. 3,939,853 (SPANONDIS) discloses a dental flosser.

U.S. Pat. No. 4,830,032 (JOUSSON) discloses an automatic toothbrush.

SUMMARY OF THE INVENTION

According to the present invention there is provided a dental flossing device comprising: a handle extending in a longitudinal axis and a head that deviates from the longitudinal axis of the handle; the head has two arms extending from the handle to define an intermediate space between the arms and a substantially central horn for guiding floss that is arranged on an upper face of the dental flossing device between the two arms and projects into the intermediate space; wherein each arm has an attachment means provided at a distal end that is adapted to receive and hold floss stretched across the intermediate space and the handle has one or more grooves on a lower face of the handle for receipt of a loop of floss.

In this way a loop or length of dental floss can be arranged on the dental flossing device in a variety of configurations to enable a user to easily and effectively floss their teeth and gums. After use the floss can be removed, and the device can be cleaned ready for reuse, reducing waste, particularly single-use plastic waste.

The shaping of the device combined with the dexterity of a user make flossing more versatile than using traditional devices because the user can choose their floss, the floss can be arranged on the device so that the floss can be rotated to a new part during use and the floss is arranged to allow the user to control the tension.

The two arms extend in the same plane in a substantially V-shaped or U-shaped arrangement so that distal ends of the arms are spaced apart. The region defined between the two arms is the intermediate space.

In preferred embodiments the handle extends along a longitudinal axis, and the head deviates from this longitudinal axis to assist a user to effectively manoeuvre the device during flossing.

In some embodiments the arms or part of one or both arm(s) may be resiliently deformable so as to be capable of flexing during use.

The attachment means enable floss to be strung securely between distal ends of the arms and a user directs this length of floss to gaps between teeth, or areas below the gum line to be cleaned.

Preferably the attachment means comprise slots that receive dental floss. The slots may be envisaged to be disposed to catch, hold and/or maintain the floss in use so that the floss does not easily dislodge or break during use, but also so the floss can pass freely through the attachment means to change tension during use or to rotate the floss.

Preferably the attachment means are slots with an opening on an outer face of the arms. This positioning ensures that the dental floss is captured in the attachment means when loading floss to the device by pulling a loop or length of floss taut along the arms until it snags into the attachment means and is least likely to be dislodged during use despite the multi-directional forces created when flossing. The attachment means areas are as close as possible to the ends of the arms, thereby reducing the amount of the device that touches the teeth and gums during use.

For the most secure holding of the floss the slots are preferably arranged to extend from the outer face of the arms axially back towards the handle. This orientation of the slots further enhances locating and maintaining the floss in the attachment means.

Preferably the slots have a smooth curved surface so that floss can run through freely and does not become worn on any sharp edges.

In some embodiments the attachment means may include resiliently deformable catch parts, which may deform to accept the floss and reform to hold the floss. The resiliently deformable catch parts may comprise female parts such as recesses arranged to receive the floss.

In other embodiments the attachment means may comprise male parts, such as studs which project out of arms to receive the floss.

In some embodiments the attachment means may include a hook end or similar to aid with capture and securing of floss in use.

The central horn provides a guiding means for the dental floss so that the orientation and tension of the loop of dental floss can be selectively altered by a user depending upon how the dental floss is arranged from the attachment means against the central horn.

In particular the central horn enables dental floss to be crossed over at the central horn and then secured. Advantageously in this way there are opposing forces applied to the dental floss to keep the dental floss secured and the dental floss is arranged close to the device and is less likely to get caught on a user or obstruct movement during use.

The central horn is a raised portion that extends from an upper surface of the device and projects into the intermediate space. Floss is positioned in use to be against and under the central horn.

Ideally the central horn is a projection with an upper lip that enables dental floss to be caught and guided against and under the lip of the central horn. In this way the floss is prevented from lifting from the central horn during use to enable effective continuous flossing.

In preferred embodiments the central horn is longitudinal so that floss is guided along the length of the projection.

A user can also easily rotate a loop of floss that is crossed over at the central horn, without removing the loop from the device, by placing a finger on the central horn and pulling on a side of the loop.

It is appreciated that the floss is preferably crossed over at a fore region of the central horn that is closer to distal ends of the arms, although in some uses, the floss may pass and cross at a rear region of the central horn.

In some embodiments the central horn has defined channels on either side of the central horn that help to guide the floss and maintain position of the floss during use. In this way the floss can be easily held taut on the dental device when passed through the channels.

In most embodiments the floss can pass freely through the attachment means on the arms and optionally against the central horn, by making use of the user's dexterity to arrange the floss on the device and control the tension of the floss making it taut as the floss passes through contact points between teeth, where a back and forth 'sawing' motion may be needed to pass through tight gaps, and then looser to 'hug' the teeth and into gums allowing an increased surface to be cleaned as the user flosses in an up-down motion on the tooth, and then the floss can be made taut again and pulled out from between teeth. This is considered the best way to floss and is not possible with traditional fixed flossing devices as these traditional fixed flossing devices do not permit variation of floss tension during use and often just result in the floss gradually loosening during use given the forces applied.

In preferred embodiments the floss can be rotated about the device during use so that a new part of floss is stretched across the intermediate space. This is important particularly for biodegradable floss which, given its nature, can fray during use. Rotating the floss is not possible with traditional fixed flossing devices.

The handle has one or more grooves for receipt of a loop or length of dental floss. The groove can be used to secure part of the loop or length of floss as the groove receives and catches the dental floss so that it is held in position.

In some preferred embodiments two or more grooves may be provided along the length of the handle so that the floss is held taut to enable effective flossing and/or can be arranged at different tensions.

When a loop of floss is passed through and held in a groove a user in not required to hold the floss in place and can simply hold the handle or can apply finger pressure to the floss to adjust tautness.

Preferably the handle grooves are designed and positioned to extend into the handle so that they do not project from the handle and interfere with manoeuvrability. Ideally the grooves extend into the handle and are directed towards the head in order to most securely catch and secure the floss. It is appreciated that in some embodiments the position of the groove corresponds to the diameter of pre-formed loops of dental floss that may be provided with the device.

Typically in use the handle is held between finger tips for enhanced manoeuvrability. Ideally the handle is ergonomically shaped for each of use. In some preferred embodiments the handle has grip pads for location of a user's fingertips to assist with gripping and manoeuvring the device. For example the grip pads may be flattened regions or depressions that help to locate fingertips and prevent slipping when in use.

In a preferred embodiment the handle has a hexagonal cross section, therefore providing an array of flat edges for a user to position their fingertips and still be able to easily rotate the device about the longitudinal axis of the handle.

In preferred embodiments the device is formed as a single part with a smooth outer surface with no sharp regions that may catch on a user's mouth.

Preferably the device has no moving parts so that the device is durable, hygienic, and easy to clean for repeated use.

The device is intended to be reusable and helps to reduce waste as only the floss is replaced. Therefore the device is not a single-use product, for example the device may be placed in a dishwasher for cleaning.

Preferably the device is made from a strong durable, medical grade material including but not limited to aluminium, stainless steel, synthetic plastics, or biodegradable material.

In some embodiments the device may include one or more projection for the dental floss to be turned around to increase tension and to lock off the floss so that it is secured to the device.

The dental floss may be secured in multiple ways upon the device depending on whether a loop of floss or length of floss is used and how the floss is arranged and secured during use. For a loop of dental floss, part of the loop may be pulled by a user's fingers or secured in grooves in the handle. For a length of floss, ends of the floss may be wrapped around the handle, through the grooves or around user's fingers to secure the floss in place.

The dental floss can be arranged on the device in various configurations and a user can therefore manually adjust the tension of the floss by the tautness at which the floss is attached to the device, or by applying fingertip pressure to part of the floss so that tension is increased and removing fingertip pressure so that tension is decreased.

Examples of methods of using the dental flossing device are now described.

A first method of using floss with a device may comprise the steps of pinching the two ends of a length of dental floss and wrapping around the user's finger, so that a small loop is created. The loop is received by the attachment means and then flipped (rotated to create a twist) to cross over against and under the central horn. The floss then passes in the channels on either side of the central horn to keep the floss in place as the device is held. This configuration uses the central horn to guide the floss to keep it close to the device so that floss runs along the handle and does not obstruct manoeuvrability. Opposing forces generated during use help to keep the floss secured. This arrangement of floss on the device enables a user to manually adjust tension of floss during use with their finger that is engaged with the loop. The loop can also be adjusted on the finger and reattached, so a new part of floss sits between the intermediate space for use.

A second method of using floss with a device may comprise the steps of fixing a first end of a length of dental floss to the handle, near to the neck or in a handle groove, guiding the dental floss diagonally across against and under the central horn to a first attachment means, across the intermediate space to the second attachment means and diagonally back across the central horn forming a cross, and securing a second end of the length of floss directly around the handle or around a user's finger first and then handle. This creates a similar configuration to the first method but using a length of floss rather than a preformed loop. This configuration uses the central horn to guide the floss, use opposing forces to keep it secured, and keep it close to the device so that is does not obstruct manoeuvrability. Securing the second end directly to the handle results that a user can easily pinch the floss but cannot adjust tension. Securing the second end around a user's finger before the handle enables a user to manually adjust tension of floss during use.

A third method of using floss with a device may comprise the steps of first making a loop by folding the dental floss in half and pinching the two ends, then winding the floss loosely once around a finger, rolling the floss back and forth to create a 'rope' of floss and finally pulling this 'rope' down to create a strong knot. A second step is fixing a side of the pre-formed loop of dental floss through the attachment means, twisting the dental floss loop to form a cross against and under the central horn and securing a second side of a loop of dental floss to a user's finger on a hand holding the device in order to apply tension to the dental floss. This configuration uses the central horn to guide the floss, use opposing forces to keep it secured, keeps it close to the device so that is does not obstruct manoeuvrability and enables a user to manually adjust tension of floss during use. The loop can also be rotated so a new part of floss sits between the intermediate space for use.

A fourth method of using floss with a device may comprise the steps of fixing a first end of a length of dental floss around a handle groove, through the attachment means, and back to the same handle groove and fixing to create a triangle of floss. In this arrangement the floss is secured in the groove so that a user is free to position their fingertips anywhere when holding the device without adjusting tension as the floss is held independently of a user's fingers, or to position their fingertips on the sides of the floss triangle to change tension.

A fifth method of using floss with a device may be the opposite order of the fourth method comprising the steps of attaching a side of a loop (typically a specifically dimensioned pre-made loop) of dental floss through the attachment means and securing the other side of a loop of dental floss to a handle groove. In this way a user is free to position their fingertips anywhere when holding the device without adjusting tension as the floss is held independently of a user's fingers, or to position their fingertips on the sides of the floss triangle to change tension. The loop can also be rotated so a new part of floss sits between the intermediate space for use.

It is appreciated that the before mentioned methods of using the dental floss on the device are examples of potential uses and that floss may also be applied in other ways selected by a user.

In some embodiments the device may be used with and in some cases supplied with pre-made loops or lengths of floss that are specifically dimensioned for the device.

Preferred embodiments of the invention will now be described by way of example only and with reference to the Figures in which:

BRIEF DESCRIPTION OF FIGURES

FIG. 1A shows a top view of the dental flossing device;

FIG. 10 shows a bottom view of the dental flossing device;

DETAILED DESCRIPTION OF FIGURES

With reference to FIGS. 1A, 1B, 10, 1D and 1E there is shown a first embodiment of the device 100 comprising a handle 1 and a head 2. The head 2 has two arms 3 extending from the handle 1 in a U-shaped arrangement to provide an intermediate space C.

Figures 1A, 1B, 1C, 1D, 1E:
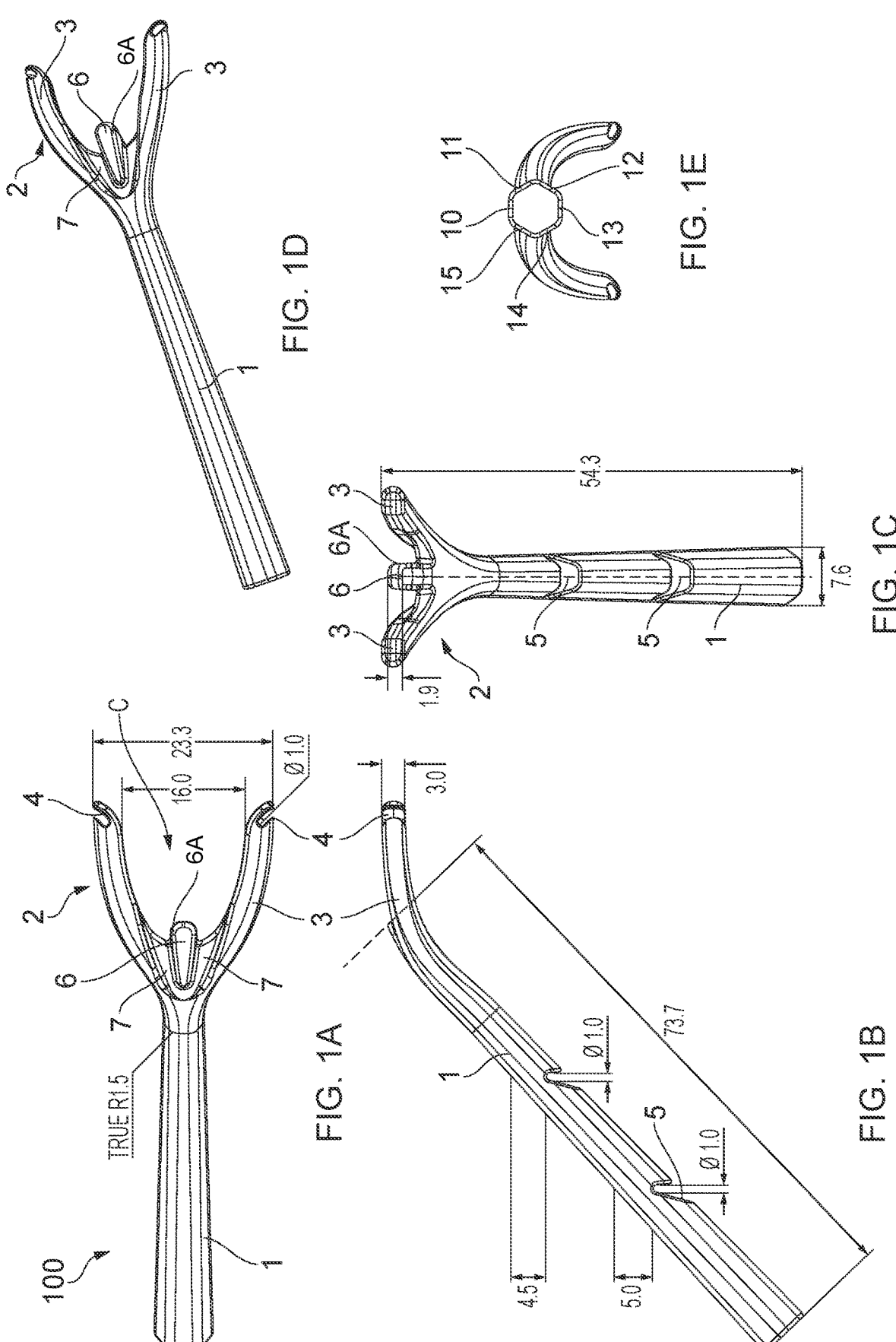
FIGS. 1A. 1B, 10, 1D and 1E show different views a preferred embodiment of the dental flossing device.
FIG. 1B shows a side view of the dental flossing device.
FIG. 1D shows a perspective view of the dental flossing device.
FIG. 1E shows a back view of the dental flossing device.

FIGS. 1A, 1B and 10 include examples of preferred dimensions provided in millimetres.

The distal ends of the arms 3 have attachment means 4 arranged to receive and hold floss (not shown in FIGS. 1A to 1E) stretched across the intermediate space C. The arms 3 have substantially round cross sections that tapers slightly towards their distal ends to assist with manoeuvring the device in a user's mouth and to ensure that no sharp edges are exposed to a user.

The pictured embodiment 100 is formed from a single cast or moulded part so as to be formed as a single part for use. Preferably the device 100 is formed from a strong, durable, medical grade material including but not limited to aluminium, stainless steel, synthetic plastics, or biodegradable material.

The handle 1 of FIG. 1 has a hexagonal cross section. The handle 1 increases in cross sectional dimension from the head towards a distal end so that the handle 1 is tapered along its length.

The flat outer faces of the hexagonal shape of the handle 1 provide grip pads 10, 11, 12, 13, 14 and 15 for a user's fingertips (see FIG. 1E).

A distal end of each arm 3 has an attachment means 4 for receiving and holding dental floss (not shown). The attachment means 4 are slots that extend from an outer edge of the arms 3 inwards substantially towards the head 2 and the central horn 6.

The handle 1 has two grooves 5 on a lower face. The grooves 5 are cut into the handle 1 with a preferred width of 1 mm at the deepest point. This width is small but easy to clean. The grooves 5 are angled into the handle 1 and directed towards the head 2 in order to securely catch and hold dental floss during use so that it cannot be easily dislodged.

The grooves 5 are used to catch the floss when it is arranged across a lower face of the device. For example, dental floss may extend from the head 2 across the lower face of the device 100 to the groove 5 where the floss is secured creating a triangle of floss arranged on the device. A user can then also press against the strands of floss that extend from the attachment means 4 to the grooves 5 to adjust tension of the floss. Alternatively floss may be arranged to cross at the central horn 6 and run adjacent to the handle 1 to the grooves 5. In this arrangement the floss is not spaced apart from the handle 1.

The central horn 6 is arranged between the two arms 3 and extends into the intermediate space C. The pictured central horn 6 is elongate and projects from an upper face of the device 100 so as to provide a guide along which dental floss may pass. The central horn has a lip 6A under which floss is held in place (see FIGS. 1A and 1D). The lip 6A extends outwards from an upper edge of the central horn 6 to catch and guide the floss. In this way the floss is prevented from lifting from the central horn during use to enable effective continuous flossing.

The central horn 6 helps to keep floss arranged on the device during use, enables the user to change tension, and enables the user to rotate the dental floss to a new part, all while remaining within the footprint of the device 100. This can assist a user to hold the device 100.

The channels 7 on either side of the central horn 6 help to guide the floss and maintain position during use.

The distal ends of the arms 3 are deviated from the longitudinal axis of the handle 1. The head 2 of the pictured embodiment (FIGS. 1A to 1E) is offset by approximately 45° with respect to the longitudinal axis of the handle 1. The deviation of the head 2 helps with accessing the teeth and gum line so that the two attachment means 4 can be placed either side of a tooth in use.

FIGS. 1A to 1E include some examples of preferred dimensions of the device, but it is appreciated that the device may be provided in a variety of different dimensions and sizes and for the purposes of this application, the scope or protection sought is not limited to the dimensions shown in the Figures.

For the purposes of FIGS. 2 to 5, hand A is the hand that will hold the dental device during flossing. For the methods shown in FIGS. 2 to 5 it is intended that when a loop is formed it may be held around a middle finger to allow the user to adjust tension using their middle finger, but other fingers may be used depending on user preference and configuration of the floss on the device.

Figure 2:
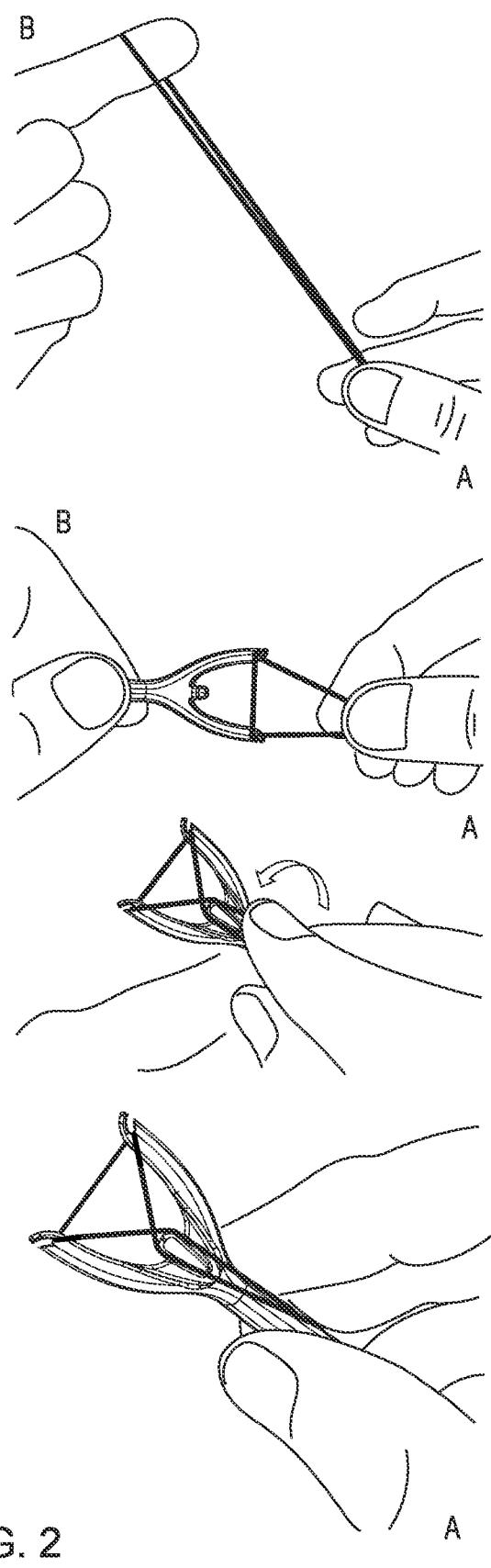
FIG. 2 shows instructions for using the dental flossing device with diagrams for a first method of use.

FIG. 2, Method 1—Using a Finger to Secure the Floss and Adjust Tension.

Way One: Finger

The Simplest Way.

1a Cut 40 cm floss. Pinch the two ends of the floss between thumb and middle finger of hand A, put a finger from hand B in the large loop created, pull tight and wind around finger of hand A three times to create a much smaller loop (about the size of a bottle top).

1b With thumb of hand A facing up, Hold dental flossing device in hand B, put arms curving up into this loop and pull away, keeping floss tight until floss snags into arm slots.

Now flip hand A putting index finger on central horn so floss crosses over under the central horn.

1c Hold dental flossing device in hand A, pull back middle finger to increase tension. Ready to use.

>Before use, to lengthen/shorten loop; unwind/wind one side of floss.

>During use, to rotate floss; detach, unwind one side of floss, wind other and reattach.

Cut around 40 cm floss and form a loop by pinching the two ends of the floss between thumb and middle finger of hand A, put a finger from hand B in the large loop created, pull tight and wind around middle finger of hand A at least three times to create a much smaller loop (about the size of a bottle top).

With the thumb of hand A facing up, hold the device in hand B, put arms curving up into this loop and pull away, keeping floss tight until the floss snags into the attachment means 4 (arm slots). Now flip hand A, putting the index finger on the central horn so floss crosses over under the central horn and runs along channels against the elongate sides of the central horn 6 and along the handle 1.

Hold the device 100 in hand A and pull back the middle finger to change tension. The device 100 with a loop of floss 200 is then ready to use. It is also possible to lengthen/ shorten the loop by unwinding/winding one side of the loop of floss.

Additionally during use a user can rotate the loop of floss on the device so that clean, unused floss is exposed to the user. To do this a user can unwind one side of floss loop, wind the other side, and reattach the floss loop.

Figure 3:
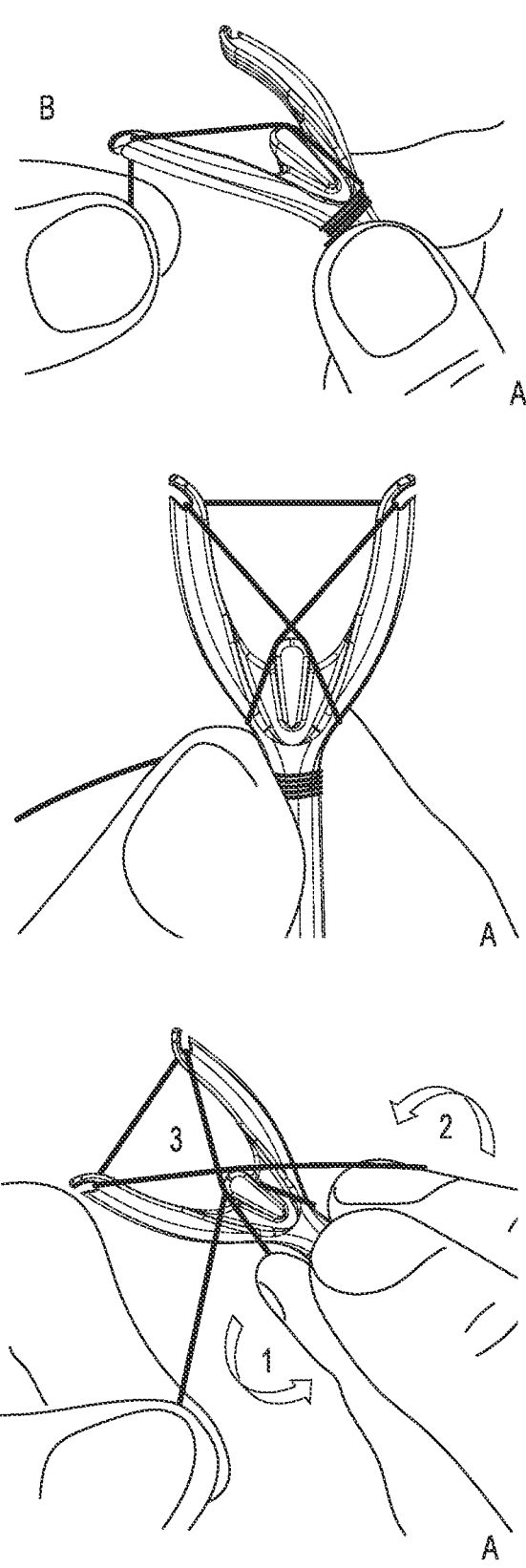
FIG. 3 shows instructions for using the dental flossing device with diagrams for a second method of use.
Figure 4A:
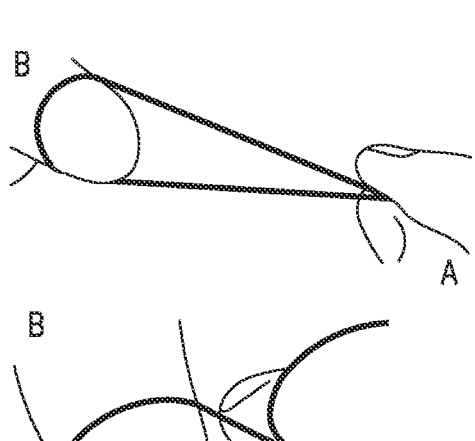
FIG. 4A shows instructions for using the dental flossing device with diagrams for a third method of use.
Figure 4A:
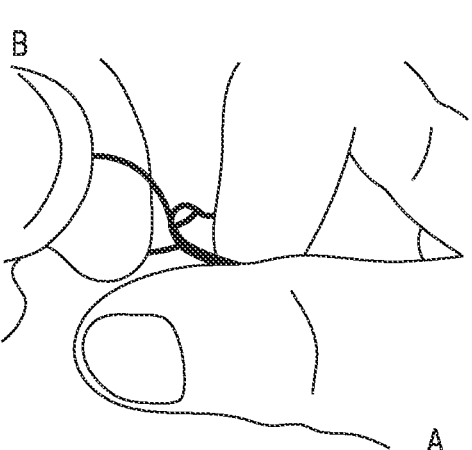
Figure 4A:
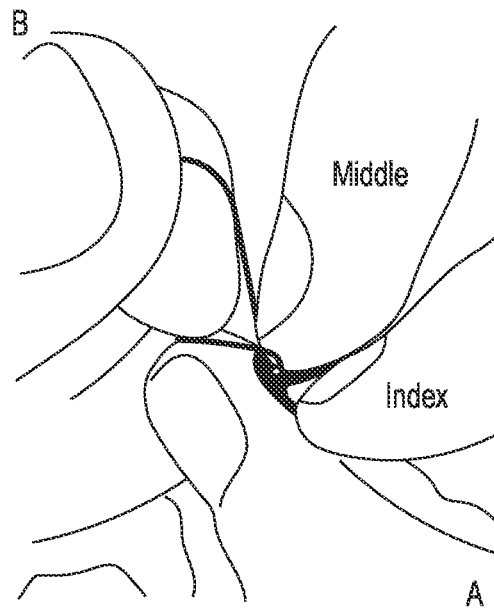
Figure 4B:
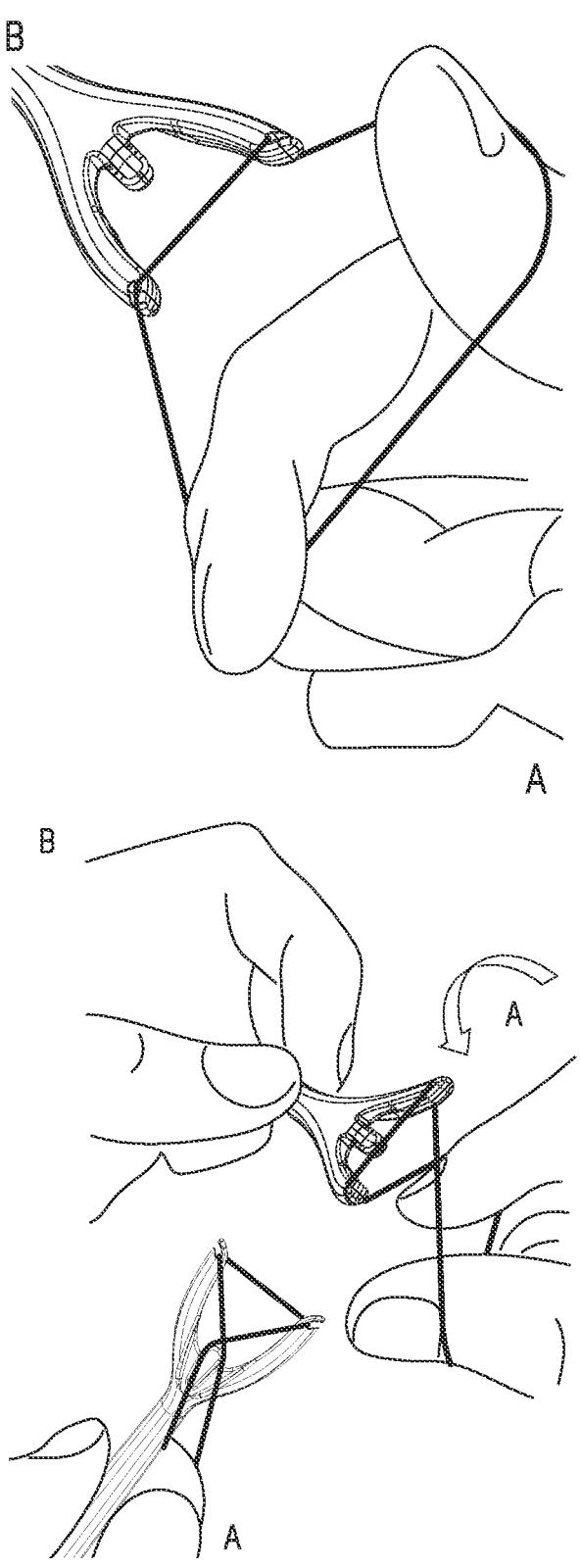
FIG. 4B shows continued instructions for the third method of using the dental flossing device.

FIG. 3, Method 2—Wrapping Dental Floss Around the Handle.

Way Two: Wrap

The Obvious Way.

2a Cut 30 cm floss.

Wrap one end of floss around handle two times near neck or in front handle groove. Guide floss up over neck, under central horn, diagonally across into arm slot (shown), then across up through other arm slot, diagonally back under central horn.

2b Guide floss back to neck or front handle groove, ***wrap floss around twice and pinch to hold floss in place (shown).

Ready to use.

>If floss loosens during use just pull on end to tighten—or to better control the tension, please see WAY TWO+for improved use.

Way Two+: Wrap+Lever

2c Control the tension of the floss during use with finger as a lever—load as above but at the ***:

1) loop under handle and 2) around index or middle finger to create the lever, 3) then back under central horn (shown) before wrapping floss around handle twice and pinching.

Ready to use.

Cut around 30 cm floss. Wrap one end of the floss around the handle 1 two times either near to the head 2 so that the head 2 acts as a stopper or into a handle groove 5. Guide the floss so that it passes against and under the central horn 6 diagonally across into the attachment means 4 on a first arm 3 and then then across the intermediate space 'C' to the second arm 3 passing through the attachment means 4 and diagonally back against and under the central horn 6. Guide the floss 200 back to the handle 1 where the first end of floss is attached and wrap the floss around at least twice and pinch where the floss is wrapped to hold the floss in place. The flossing device 100 is then ready to use. If the floss 200 loosens during use a user 300 can just pull the end of the floss to tighten.

Alternatively the user 300 can control the tension of the floss during use with a finger acting as a lever. For example load the device 100 with floss 200 as described above but after guiding the floss back against and under the central horn 6, pass the floss under the handle 1 and around index or middle finger to create the lever and then back under the central horn 6 before wrapping floss around handle 1 twice and pinching. This enables a user 300 to apply tension to the floss by pulling the finger around which the floss is wrapped. FIG. 4, Method 3—Use a Loop of Floss which may be Premade or Made when Required.

Way Three: Loop

Our Favorite Way.

First Make the Loop:

> 3*a* Cut 20 cm floss. Fold in half and pinch the two loose ends between thumb and index finger of hand A and put finger from hand B in the large loop \*\*.
>
> \*\*flat/slippery floss can be difficult to roll, if so before you wind; wet fingers and spin hand B's finger which twists floss
>
> Now wind the floss loosely around hand A's index finger once.
>
> 3*b* Roll the floss back and forth between hand A's thumb and index finger to create a twisted 'rope' of floss and roll this 'rope' off A's index finger.
>
> 3*c* Grab the 'rope' with hand A's middle finger and pull down, creating a strong knot.
>
> You now have a floss loop.

Now Load the Loop:

> 3*d* Hold pre-made floss loop over thumb and index finger of hand A (or thumb and middle finger if prefer a larger loop) with fingers pointing up.
>
> Hold dental flossing device in hand B, put arms curving up into this loop on side away from you and snag floss into arm slots (shown).
>
> 3*e* Turn hand A so fingers now point down and so the loop crosses over and sits under the central horn.
>
> Remove thumb from loop and hold dental flossing device in hand A.
>
> Ready to use.
>
> >During use, rotate floss to a new part as needed.
>
> >After use, please break loop before disposing.
>
> A preferred way to make a loop is to cut 20 cm floss 200, fold in half and pinch the two loose ends between thumb and index finger of hand A and put finger from hand B in the large loop. Then wind the floss 200 loosely around hand A's index finger once.
>
> Roll the floss 200 back and forth between hand A's thumb and index finger to create a twisted 'rope' of floss and roll this 'rope' off A's index finger. Grab the 'rope' part with hand A's middle finger and pull down, creating a strong knot so that a loop is formed.
>
> The loop is loaded on the device 100 by holding the loop open over thumb and index finger of hand A (or thumb and middle finger if a larger loop is preferred) with fingers pointing up. Hold the device in hand B, put arms curving up into this loop on side away from you and snag floss into attachments 4 (arm slots).
>
> Turn hand A so fingers now point down and so the loop crosses over and sits against and under the central horn 6. Remove thumb from loop and hold floss 200 in hand A. The device and floss loop are then ready to use. During use, a user pulls down with their finger to apply tension. A user 300 can rotate floss so a new part sits across the intermediate space 'C' as needed. After use the floss 200 can be removed from the device 100, the loop broken before disposing.

Figure 5:
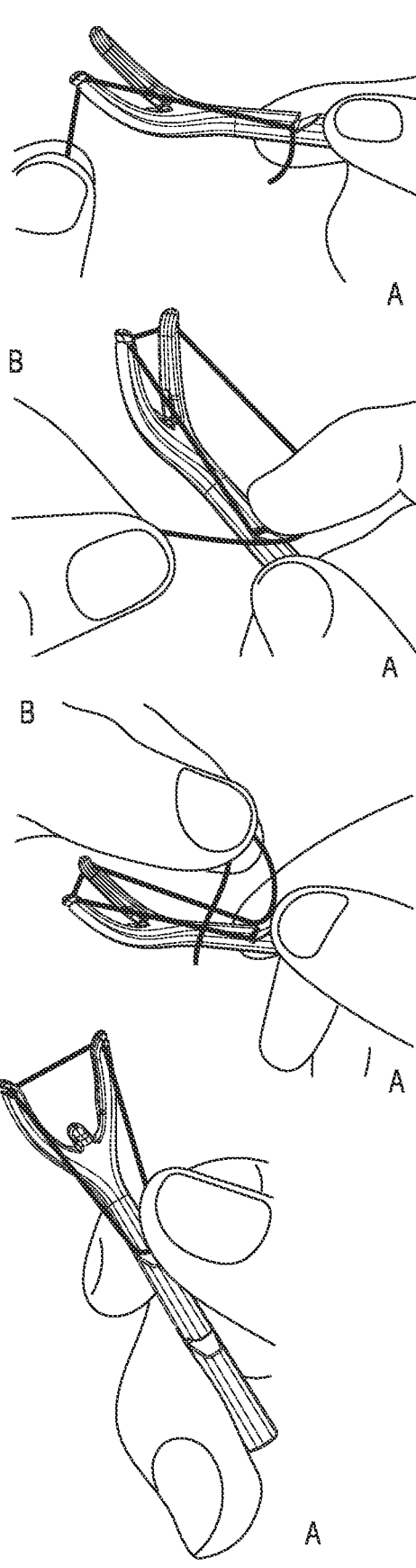
FIG. 5 shows instructions for using the dental flossing device with diagrams for a fourth method of use.

FIG. 5, Method 4—Triangle Formation.

Way Four: Triangle

> 4*a* Cut 25-30 cm floss. Hold dental flossing device between thumb and index finger with arms curving up and away from you, wrap one end of floss around front (25 cm) or back (30 cm) handle groove two times. Guide floss off handle groove wall into arm slot (shown).

> 4*b* Guide across to other arm slot, back down to same handle groove, place finger above handle groove to guide floss back into this groove (shown) and pull tight to create a triangle of floss.
>
> 4*c* Wind around three times tightly and feed end of floss back through triangle in same direction you were winding (shown)\*.
>
> \*To remove: slip end of floss through triangle in reverse direction and unwind.
>
> Pull down to anchor in place, making sure floss stays behind handle groove walls.
>
> 4*d* Pinch the sides of the triangle to change tension— Ready to use.
>
> Cut 25-30 cm floss 200. Secure one end of the floss 200 in a groove 5 by wrapping the floss around and through the groove at least twice. Pass the floss from the groove 5 to the first attachment means 4 and then across the intermediate space 'C' to the second attachment means and guide back to the same handle groove 5 and wind three times. To secure the floss end, feed the end of floss 200 back through the triangle that has been created in same direction floss is wrapped around the handle and pull down the end of floss to anchor and lock the end. A user 300 can apply pressure to the lengths of floss between the attachment means and the groove to change tension. To remove slip the end of floss through triangle in reverse direction and unwind.

It may be envisaged that pre-made loops of floss may be used to easily prepare the tool for use, particularly for Method 3 and Method 4.

Figure 6:
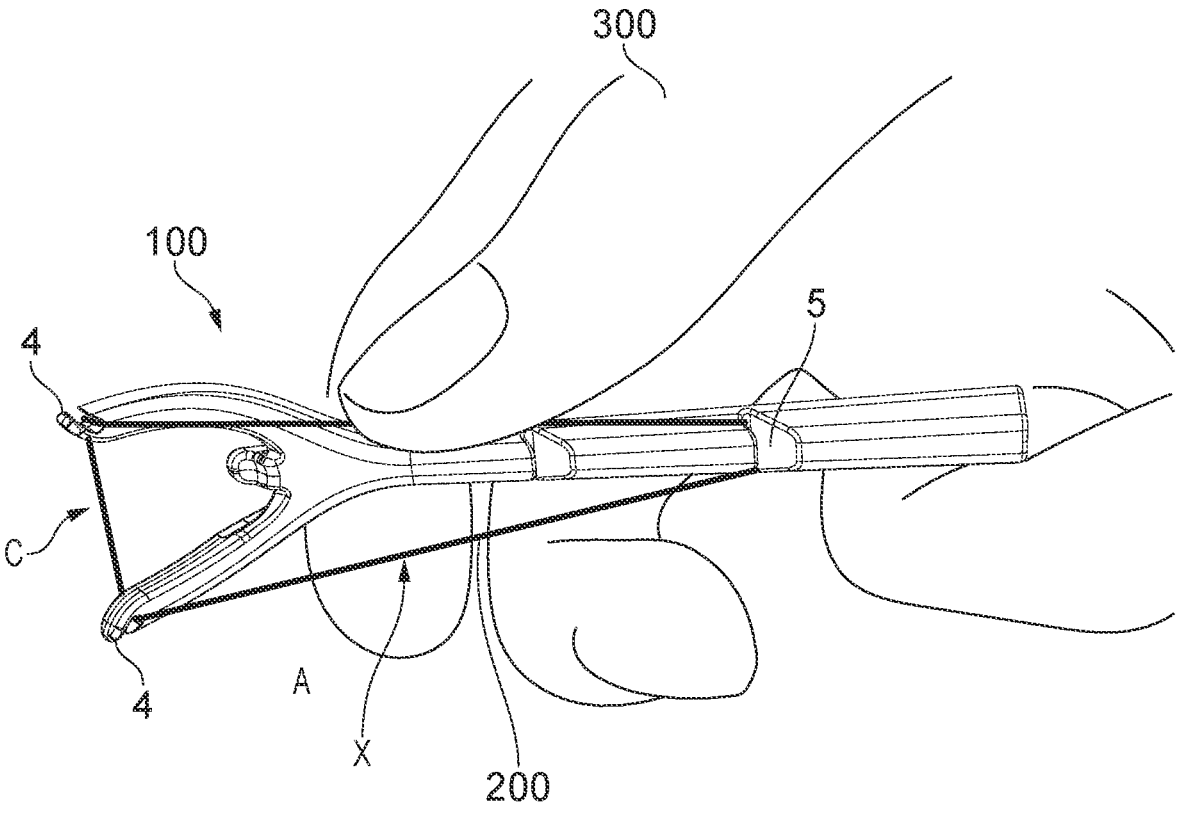
FIG. 6 shows a dental flossing device held by a user using the fourth method shown in FIG. 5.

FIG. 6 shows a dental flossing device 100 held by a user 300 with floss 200 applied as per method 4 shown in FIG. 5. A loop of floss 200 passes through the attachment means 4 across the intermediate space C and through a groove 5 on the handle 1. A user's 300 thumb and finger can be placed on the floss 200 to increase tension of the floss (at point X) on the device 100.

The invention has been described by way of examples only and it will be appreciated that variation may be made to the above-mentioned embodiments without departing from the scope of invention as defined by the claims.

The invention claimed is:

1. A method of using dental floss with a dental flossing device comprising: a handle extending in a longitudinal axis; and a head that deviates downward from the longitudinal axis of the handle; the head has two arms extending in the longitudinal axis direction from the handle to define an intermediate space between the two arms; and a substantially central horn for guiding dental floss, the horn being arranged on a top face of the dental flossing device between the two arms and projecting into the intermediate space, wherein each of the two arms has a top-to-bottom slot provided from a top face through to a bottom face of the dental flossing device at a distal end, the top-to-bottom slot being adapted to receive and hold the dental floss stretched across the intermediate space, the top-to-bottom slot providing an edge for supporting a usable portion of the dental floss at a radially top-most face or a radially bottom-most face of each of the two arms, and the handle has one or more grooves on the bottom face of the handle for receipt of a loop of the dental floss, the method comprising the steps of:

> pinching two ends of a length of the dental floss; and
>
> wrapping the length of the dental floss around a user's finger leaving a small loop of the dental floss that is secured to the top-to-bottom slot of each of the two arms, allowing the user to apply tension to the dental floss.

2. A method of using dental floss with a dental flossing device comprising: a handle extending in a longitudinal axis; and a head that deviates downward from the longitudinal axis of the handle; the head has two arms extending in the longitudinal axis direction from the handle to define an intermediate space between the two arms; and a substantially central horn for guiding dental floss, the horn being arranged on a top face of the dental flossing device between the two arms and projecting into the intermediate space, wherein each of the two arms has a top-to-bottom slot provided from a top face through to a bottom face of the dental flossing device at a distal end, the top-to-bottom slot being adapted to receive and hold the dental floss stretched across the intermediate space, the top-to-bottom slot providing an edge for supporting a usable portion of the dental floss at a radially top-most face or a radially bottom-most face of each of the two arms, and the handle has one or more grooves on the bottom face of the handle for receipt of a loop of the dental floss, the method comprising the steps of:

wrapping a first end of a length of the dental floss around the handle, guiding the dental floss diagonally across the central horn to the top-to-bottom slot of a first of the two arms, across to the top-to-bottom slot of a second of the two arms and diagonally back across the central horn forming a cross, and securing a second end of the length of the dental floss either around a user's finger and then the handle in order to apply tension, or directly to the handle.

3. A method of using dental floss with a dental flossing device comprising: a handle extending in a longitudinal axis; and a head that deviates downward from the longitudinal axis of the handle; the head has two arms extending in the longitudinal axis direction from the handle to define an intermediate space between the two arms; and a substantially central horn for guiding dental floss, the horn being arranged on a top face of the dental flossing device between the two arms and projecting into the intermediate space, wherein each of the two arms has a top-to-bottom slot provided from a top face through to a bottom face of the dental flossing device at a distal end, the top-to-bottom slot being adapted to receive and hold the dental floss stretched across the intermediate space, the top-to-bottom slot providing an edge for supporting a usable portion of the dental floss at a radially top-most face or a radially bottom-most face of each of the two arms, and the handle has one or more grooves on the bottom face of the handle for receipt of a loop of the dental floss, the method comprising the steps of:

fixing a first side of a loop of the dental floss through the top-to-bottom slot on each of the two arms, twisting the dental floss loop to form a cross that is secured against either of two sides on the central horn and securing a second side of the loop of the dental floss to a user's finger on a hand holding the dental flossing device in order to apply tension to the dental floss.

4. A method of using dental floss with a dental flossing device comprising: a handle extending in a longitudinal axis; and a head that deviates downward from the longitudinal axis of the handle; the head has two arms extending in the longitudinal axis direction from the handle to define an intermediate space between the two arms; and a substantially central horn for guiding dental floss, the horn being arranged on a top face of the dental flossing device between the two arms and projecting into the intermediate space, wherein each of the two arms has a top-to-bottom slot provided from a top face through to a bottom face of the dental flossing device at a distal end, the top-to-bottom slot being adapted to receive and hold the dental floss stretched across the intermediate space, the top-to-bottom slot providing an edge for supporting a usable portion of the dental floss at a radially top-most face or a radially bottom-most face of each of the two arms, and the handle has one or more grooves on the bottom face of the handle for receipt of a loop of the dental floss, the method comprising the steps of:

fixing a first end of a length of the dental floss around a handle groove, through the top-to-bottom slot on a first of the two arms, across to the top-to-bottom slot on a second of the two arms, and back to the same handle groove, and fixing to create a triangle of the dental floss.

\* \* \* \* \*